United States Patent
Matsuda (10) Patent No.: US 6,678,180 B2
(45) Date of Patent: Jan. 13, 2004

(54) POWER SEMICONDUCTOR MODULE (75) Inventor: Naotaka Matsuda, Nagano (JP)

(73) Assignee: Fuji Electric Co, Ltd., Kawasaki (JP)

(*) Notice: Subject to any disclaimer, the term of this patent is extended or adjusted under 35 U.S.C. 154(b) by 0 days.

(21) Appl. No.: 10/032,327

(22) Filed: Dec. 31, 2001

(65) Prior Publication Data
US 2002/0089321 A1 Jul. 11, 2002

(30) Foreign Application Priority Data
Jan. 9, 2001 (JP) ........................................ 2001-001169

(51) Int. Cl.⁷ ..................... H02M 7/5387; H02H 7/122
(52) U.S. Cl. ..................... 363/132; 363/56.02; 318/810
(58) Field of Search ............................. 363/65, 56.02, 363/132, 127, 131, 98, 97, 57, 17, 16; 361/87, 56, 57; 318/798, 810

(56) References Cited

U.S. PATENT DOCUMENTS

| | | | | |
|---|---|---|---|---|
| 4,126,819 A | * | 11/1978 | Stobbe et al. ............... | 318/810 |
| 4,796,145 A | * | 1/1989 | Oshikiri ....................... | 361/57 |
| 4,989,127 A | * | 1/1991 | Wegener ...................... | 363/16 |
| 6,421,258 B1 | * | 7/2002 | Soldavini et al. .......... | 363/56.02 |

FOREIGN PATENT DOCUMENTS

| | | |
|---|---|---|
| JP | 63-316514 | 12/1988 |
| JP | 07-007967 | 1/1995 |

* cited by examiner

Primary Examiner—Rajnikant B. Patel (57) ABSTRACT

A power semiconductor module that automatically sets an optimum dead time without being affected by the switching characteristics or driving mode of individual power semiconductor devices. The power semiconductor module includes a pair of IGBTs disposed in an upper and lower arm, respectively, and driving circuits for driving IGBTs. The power semiconductor module includes current detecting circuits and zero current detecting circuits for detecting that the output current of each of the IGBTs has become nearly zero, an inverting circuit, upper arm driving circuit and lower arm driving circuit for generating actual driving signals for each IGBT, using the output signals of the zero current detecting unit and ON commands for the IGBTs of the other arms.

22 Claims, 7 Drawing Sheets

POWER SEMICONDUCTOR MODULE

CROSS-REFERENCE TO RELATED APPLICATIONS

This application claims the benefit of Japanese application No. 2001-001169, filed Jan. 9, 2001, the disclosure of which is incorporated herein by reference.

BACKGROUND OF THE INVENTION

1. Field of the Invention

The present invention relates to a power semiconductor module, typically utilized in a power conversion apparatus, such as an inverter or power supply, and more particularly the present invention relates to a power semiconductor device, such as an insulated-gate bipolar transistor or an intelligent power module, which incorporates a drive circuit in the same package.

2. Description of the Related Art

Figure 6:
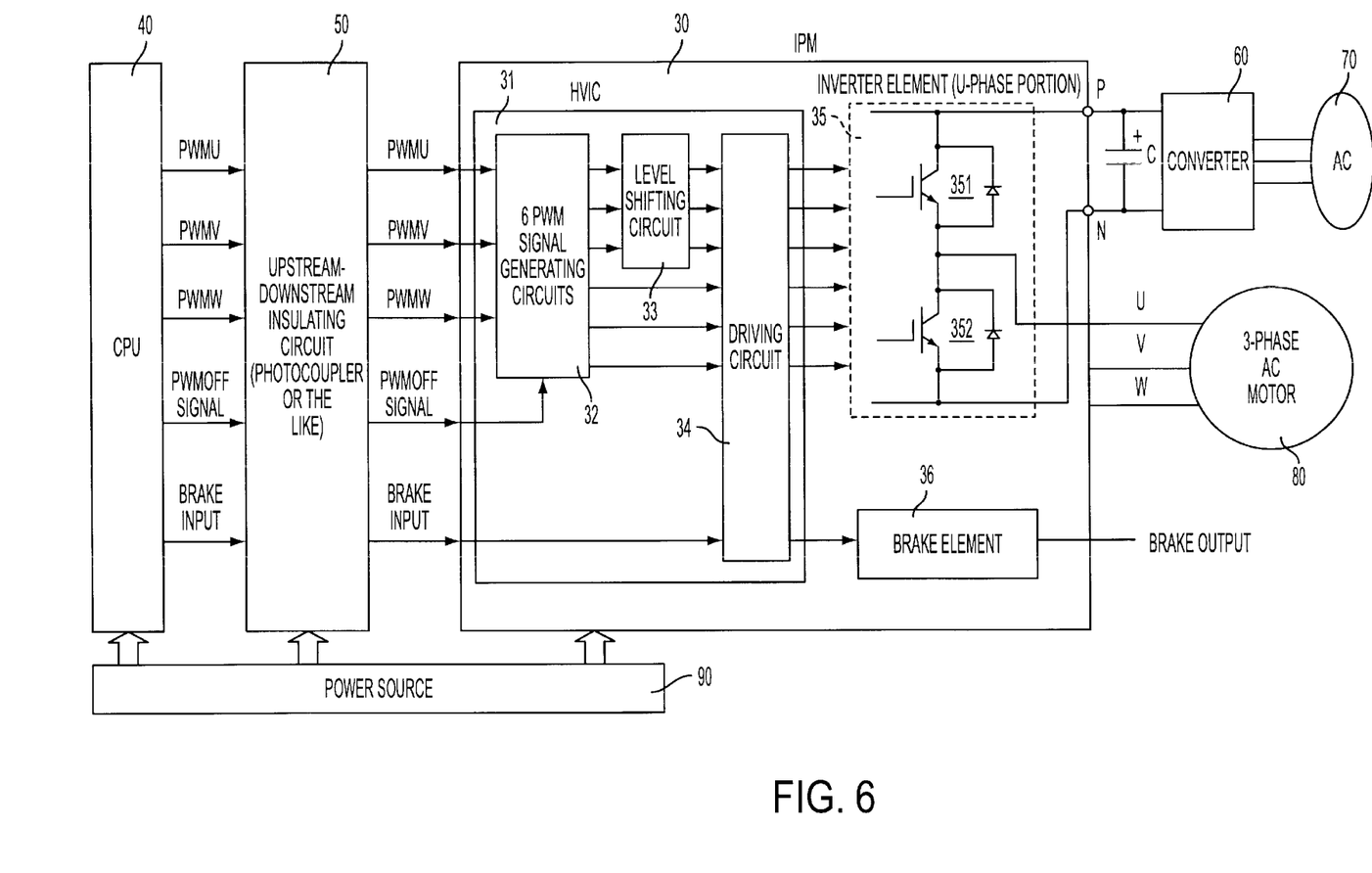
FIG. 6 is a block diagram of a power conversion apparatus.

FIG. 6 is a block diagram showing an inverter for a pulse width modulation ("PWM" hereinafter) control apparatus, using an intelligent power module ("IPM" hereinafter).

In FIG. 6, IPM 30 includes a high voltage IC (integrated circuit) (hereinafter referred to as an HVIC) 31, which is inputted with U-phase, V-phase, and W-phase PWM signals PWMU, PWMV, PWMW, and a PWMOFF signal, and generates driving signals for brake element 36 and inverter element 35, which converts direct current (DC) power to alternating current (AC) power by using the above-mentioned driving signals to cause power semiconductor devices to perform switching.

Furthermore, IPM 30 is also provided with protective circuits for performing such functions as overcurrent protection, short-circuit protection, overheat protection, supply under-voltage protection, and accident diagnostic circuits for outputting a warning to the outside when a protective circuit operates. However, for the sake of expediency, these circuits have been omitted from FIG. 6.

HVIC 31, as will be described in detail below, includes: a signal generating circuit 32, which is inputted with PWM signals PWMU, PWMV, PWMW, and a PWMOFF signal, and generates six PWM signals; a level shifting circuit 33 for converting the level of PWM signals for each insulated-gate bipolar transistor (hereinafter referred to as IGBT) of the three upper arms of inverter element 35, for example, to signals that use a positive direct current potential as a reference; and a driving circuit 34 for generating and outputting driving signals (ON, OFF signals) at levels capable of driving each IGBT, based on the total of six PWM signals from the signal generating circuit 32 and level shifting circuit 33.

Inverter element 35 includes a pair of switching arms 351 and 352, each including an IGBT and a free wheeling diode connected in an inverse-parallel condition thereto, and connected in series top and bottom. The three-phase (U-phase, V-phase, W-phase) segments of inverter element 35 are connected in parallel, but for the sake of expediency, only the U-phase segment is shown in the example given in FIG. 6.

Further, brake element 36 generates a damping force for applying a brake to a three-phase AC motor 80, which is the load of inverter element 35.

FIG. 6 also illustrates an AC power supply 70, a converter 60 for performing AC/DC conversion, and a smoothing capacitor C, with terminals of the smoothing capacitor C being connected to the DC terminals P, N of inverter element 35.

Further, three-phase AC motor 80 may be connected to output terminals U, V, W of each phase of the inverter element 35.

Furthermore, the above-mentioned PWM signals PWMU, PWMV, PWMW and PWMOFF signal, and a brake input signal are inputted to HVIC 31 inside IPM 30 from a CPU 40 via an upstream-downstream insulating circuit 50 such as a photocoupler, with reference numeral 90 designating the power supply for IPM 30, CPU 40 and insulating circuit 50.

Figure 7:
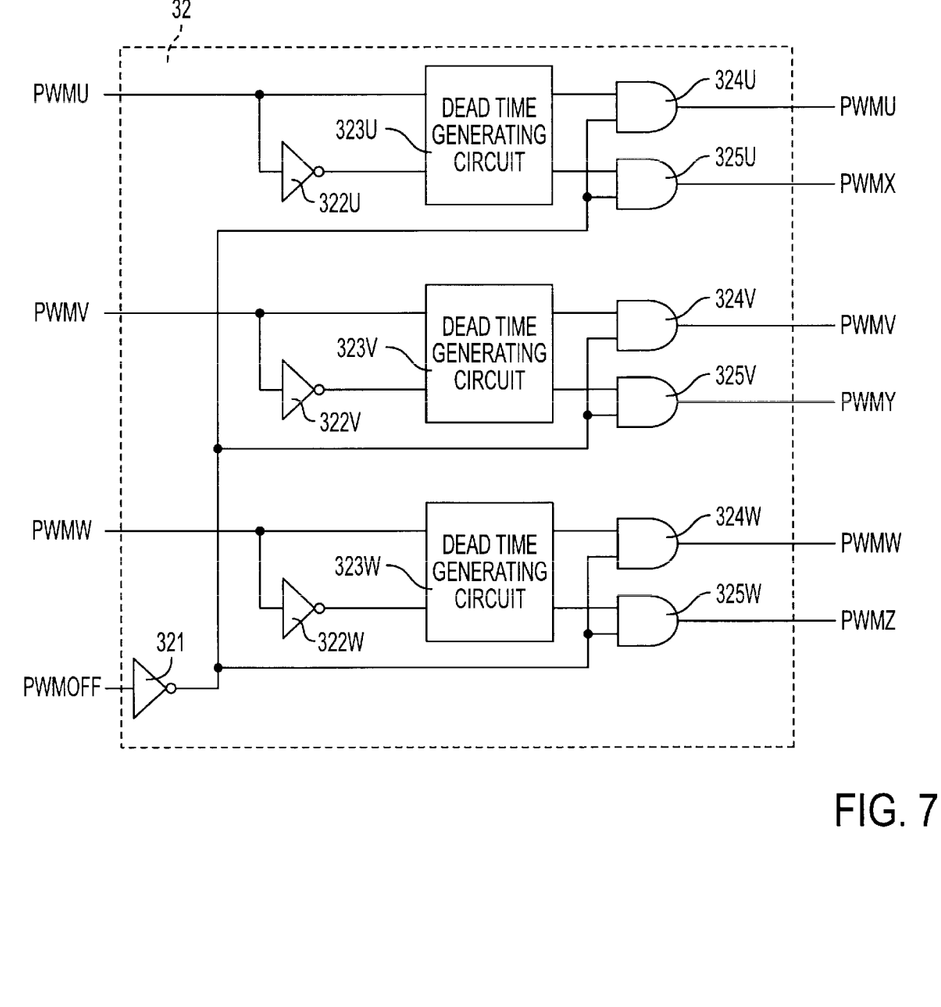
FIG. 7 is a block diagram of a signal generating circuit.

FIG. 7 shows the above-mentioned signal generating circuit 32 in more detail. Signal generating circuit 32 includes: inverting circuit 321 to which a PWMOFF signal is inputted; inverting circuits 322U, 322V, 322W to which PWM signals PWMU, PWMV, PWMW are respectively inputted; dead-time generating circuits 323U, 323V, 323W to which PWM signals PWMU, PWMV, PWMW and output signals of inverting circuits 322U, 322V, 322W are respectively inputted; and AND circuits 324U, 324V, 324W, 325U, 325V, 325W, which are inputted with respective output signals from dead-time generating circuits 323U, 323V, 323W and an output signal from inverting circuit 321, and which output PWM signals to the IGBT of the upper and lower arms of each phase.

Regarding signal generating circuit 32, the output signal of AND circuit 324U makes up PWM signal PWMU for the IGBT of the upper arm of the U-phase, the output signal of AND circuit 325U makes up PWM signal PWMX for the IGBT of the lower arm of the U-phase, the output signal of AND circuit 324V makes up PWM signal PWMV for the IGBT of the upper arm of the V-phase, the output signal of AND circuit 325V makes up PWM signal PWMY for the IGBT of the lower arm of the V-phase, the output signal of AND circuit 324W makes up PWM signal PWMW for the IGBT of the upper arm of the W-phase, and the output signal of AND circuit 325W makes up PWM signal PWMZ for the IGBT of the lower arm of the W-phase.

In signal generating circuit 32 of FIG. 7, for example, PWM signal PWMU and a signal that inverts the phase thereof 180° are inputted to U-phase dead-time generating circuit 323U. Then, to prevent a short circuit due to simultaneously turning ON the IGBT of the upper and lower arms, dead time is created and outputted between the two input signals.

When the PWMOFF signal is not inputted (when the PWMOFF signal is at a "low" level), the output signals of dead-time generating circuit 323U outputted via AND circuits 324U and 325U makes up, respectively, PWM signals PWMU and PWMX for the IGBT of the U-phase upper and lower arms as-is. Further, when the PWMOFF signal is inputted (when the PWMOFF signal is at a "high" level), there are no output signals from AND circuits 324U and 325U, and PWM signals PWMU, PWMX are OFF.

In addition, "Load Current Polarity Discrimination Method and Inverter System" disclosed in Japanese patent application laid-open publication no. 7-7967 (Jan. 10, 1995), discloses an attempt to compensate for dead time by determining the polarity of the motor current and correcting the PWM signal. This is because an error occurs between the inverter voltage that originally should have been outputted and the actual inverter output voltage due to the effect of dead time, and this error voltage distorts the motor current.

Thus, Japanese patent application laid-open publication no. 7-7967 relates to a dead-time compensation method for an inverter apparatus for converting DC to AC and supplying this AC to a load by using PWM signals to alternately turn upper and lower arm switching devices ON and OFF while interposing dead time that turns the upper and lower arm switching devices OFF simultaneously. Japanese patent application laid-open publication no. 7-7967 is directed to an inverter dead-time compensation method for detecting the existence of current flowing through the switching device of either the upper or lower arm, for determining the instantaneous polarity of a load current from the relationship between a specific current conducting direction and the existence of current in the pertinent switching device during the interval when this switching device is in the ON state, and, in accordance with this instantaneous polarity, increasing by a predetermined correction quantity the ON interval of a PWM signal for the arm of the one side from among the PWM signals outputted to the upper arm and lower arm, and, in addition, decreasing the PWM signal ON interval by the above-mentioned correction quantity for the arm of the other side.

In Japanese patent application laid-open publication no. 7-7967, an inverter apparatus for converting DC to AC and supplying this AC to load, includes a switching device, which is connected to a DC power source in the form of upper and lower arms, and which alternately turns ON and OFF, PWM signal generating means, and a driving circuit for driving the switching device in accordance with a PWM signal. The inverter apparatus further includes: means for detecting the existence of a current flowing through the switching device of either the upper or lower arm; current direction detecting means, which is connected to PWM signal generating means and current detecting means, and which determines the instantaneous polarity of a load current by the relationship between a specific current conducting direction and the existence of current in a switching device during the interval when the switching device is in the ON state; and means for outputting either a voltage command to PWM signal generating means or a signal for correcting a PWM waveform, in accordance with the polarity of the load current.

Furthermore, "Turn-ON Locking Circuit of a Transistor Switching Apparatus" disclosed in Japanese patent no. 2560728 is related to a circuit for locking the turn-ON of a transistor so as to hold the dead time of a switching operation to the minimum while preventing a transistor arm short circuit.

Japanese patent no. 2560728 is sets forth the provision of turn-ON locking means, which, when the transistor of the one side corresponding to the same arm turns OFF, determines that a reverse bias voltage has been established between the base and emitter thereof, and applies a turn-ON signal to the transistor of the other side.

In the power conversion apparatuses shown in FIGS. 6 and 7, IGBT switching characteristics must be known beforehand when setting dead time via dead-time generating circuits 323U, 323V, and 323W.

For example, after providing an OFF command to the IGBT of the lower arm, to determine the delay time until an ON command is provided to the IGBT of the upper arm, consideration is given to the maximum time $t_{off(max)}$ after providing an OFF command to the lower arm IGBT until the collector current thereof is practically zero and to the minimum time $t_{on(min)}$ after providing an ON command to the upper arm IGBT until the collector current thereof begins to flow $t_{on(min)}$, and sufficient time is calculated for preventing a short circuit due to simultaneously turning ON the IGBT of the upper and lower arms. Each of the above-mentioned times $t_{off(max)}$ and $t_{on(min)}$ is generally measured using an existing standardized driving circuit.

However, when using another IGBT for the purpose of improving characteristics, such as reducing switching loss, a problem arises in which switching characteristics are checked, and dead time is reset each time such an IGBT is used. Further, the switching time of IGBT and other such power semiconductor devices is largely dependent on the driving circuit and the driving mode, as well as the characteristics of the device itself. In other words, because the switching characteristics of a power semiconductor device are first determined in a state wherein a driving circuit used as an IPM and a power semiconductor device are combined, the need also arises to reset dead time at the point in time when the IPM circuit is actually formed.

Furthermore, in the past, dead time was set a little longer to allow sufficient time, but this was also a problem in that, by doing so, actual output voltage and current distortion became prominent, causing inverter control performance to take a turn for the worse.

Further, the power conversion apparatus shown in Japanese laid-open patent publication no. 7-7967 was strictly directed to compensating dead time, and did not provide a technology for performing switching by automatically setting the optimum dead time.

Furthermore, in Japanese laid-open patent publication no. 7-7967, current direction detecting means for determining the polarity of the motor current (load current), and correction signal outputting means for outputting, in accordance with current polarity, either a voltage command to PWM signal generating means, or a signal for correcting a PWM command are essential. These current direction detecting means and correction signal outputting means contributed to making the circuitry more complex.

Turn-ON locking means discussed in Japanese patent no. 2560728 included a comparator for comparing a reverse bias voltage between the base and emitter of the transistor of the one side against a reference value, and a NAND gate, which is directly inputted with the outputted signal thereof, and which generates a turn-ON signal for the transistor of the opposing arm side.

However, because the reference potential differs for the upper arm transistor and lower arm transistor, normal operation cannot be maintained without the intervention of an isolating amplifier or an optoisolator between the output side of the comparator and a transistor, raising a problem from the standpoint of achieving practicability.

SUMMARY OF THE INVENTION

To solve the above and other aspects, it is an object or the present invention to provide a power semiconductor module capable of automatically setting the optimum dead time without being effected by a driving circuit, a driving mode, or the characteristics of individual power semiconductor devices.

Another object of the present invention is to provide a power semiconductor module having an enhanced control performance of the inverter so as not to set a dead time that is longer than necessary.

Further, another object of the present invention is to provide a power semiconductor module which is capable of setting the optimum dead time using a relatively simple circuit constitution.

Objects of the present invention are achieved with a semiconductor module including an inverter, for example, and a pair of power semiconductor devices, such as IGBT, disposed in upper and lower arms, respectively, and driving circuits for driving the semiconductor devices thereof.

Embodiments of the present invention are characterized in having a zero current detecting unit and a driving signal generating unit. The zero current detecting unit detects that the output current of the power semiconductor device of the arm of the one side of the upper and lower arms has practically reached zero, and driving signal generation unit generates an actual driving signal for the power semiconductor device of the arm of the other side when there exists an output signal of the zero current detecting unit (a signal, which detected that the current has almost reached zero), and there exists an ON command for the power semiconductor device of the arm of the other side.

Embodiments of the present invention including the zero current detecting unit can include the following various modes.

For example, zero current detecting unit provides current detecting circuits, such as a current transformer and shunt resistor, to the output side of a power semiconductor device, for directly detecting the output current of a power semiconductor device, and for detecting that the value thereof has become practically zero. Further, as another example, the zero current detecting may detect a current proportional to an output current, from a terminal such as a sense emitter disposed in a power semiconductor device.

Furthermore, embodiments of the present invention may also have a zero current detecting unit to detect output current from the control terminal voltage of a power semiconductor device (in the case of an IGBT, this is the voltage between the gate and the emitter).

As another example, the zero current detecting unit, in embodiments of the present invention may also provide inductance through which the output current of a power semiconductor device flows, and detect that output current is practically zero, based on current changes in this inductance.

Embodiments of the present invention preferably include a zero current detecting unit and driving signal generating unit via high-voltage ICs (HVIC). Here, driving signal generating unit includes primarily logic circuits, such as AND circuits and inverting circuits.

Further, embodiments of the present invention may be, for example, utilized as a semiconductor module for a PWM inverter, and an ON command, which is inputted to the above-mentioned driving signal generating unit in this case, including a PWM signal generated by comparing an output voltage command against a modulated wave of the inverter.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
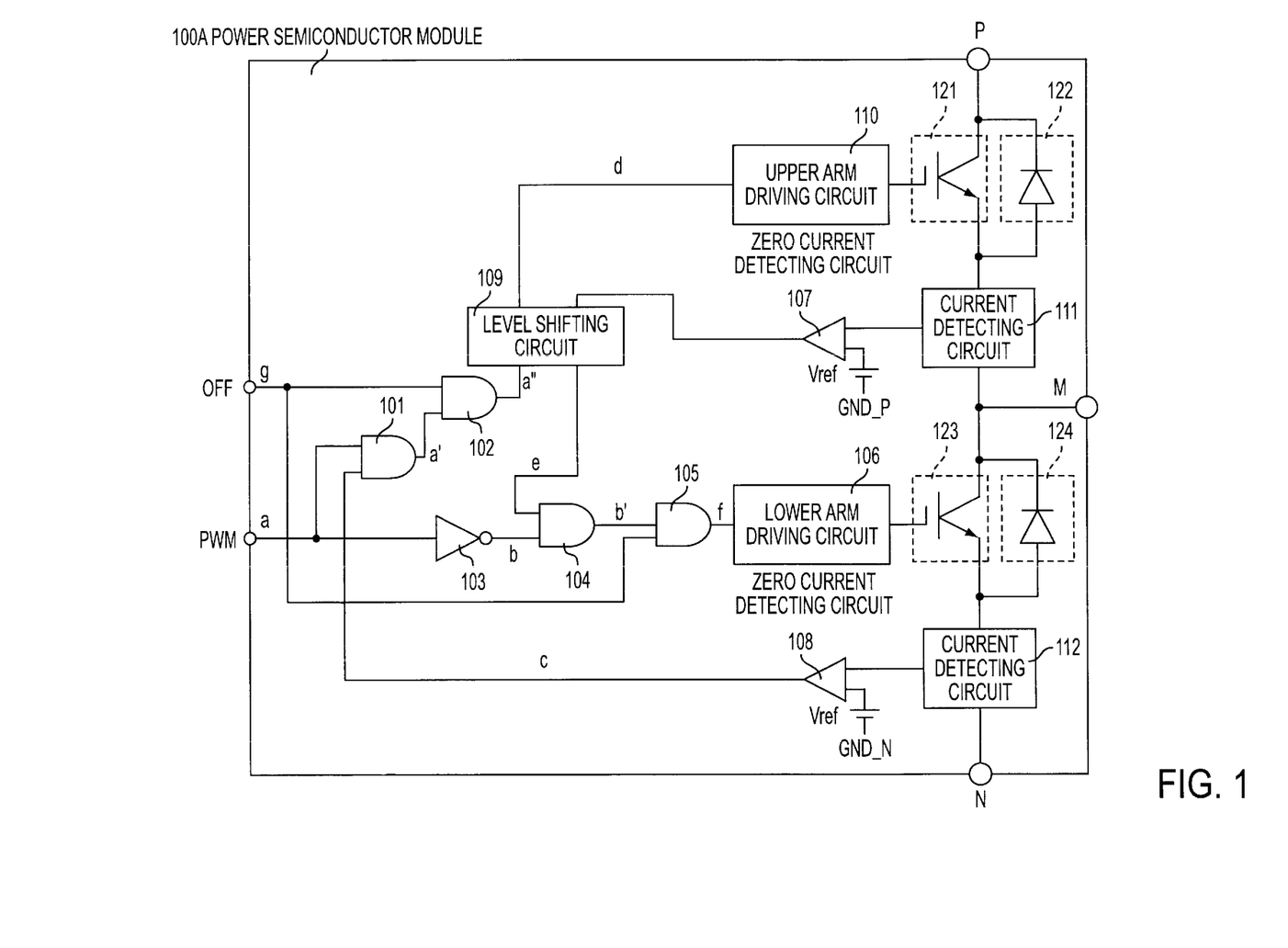
FIG. 1 is a circuit diagram showing an embodiment of the present invention.

First, FIG. 1 is a circuit diagram showing an embodiment of the present invention. Although FIG. 1 only shows a driving circuit and a current detecting circuit for one phase segment of an inverter element, the circuitry of FIG. 1 can provide three phase segments for a three-phase inverter.

The power semiconductor module 100A shown in FIG. 1 includes: an IGBT 121 as a power semiconductor device making up the upper arm of an inverter element; a free wheeling diode 122 connected in an inverse-parallel condition thereto; an IGBT 123 as a power semiconductor device making up the lower arm of the inverter element; a free wheeling diode 124 connected in an inverse-parallel condition thereto; a current detecting circuit 111 connected between the emitter of IGBT 121 and an AC output terminal M; and a current detecting circuit 112 connected between the emitter of IGBT 123 and a negative DC input terminal N. Furthermore, as illustrated in FIG. 1, P indicates a positive DC input terminal.

The above-mentioned current detecting circuits 111 and 112, for example, make up a current transformer and shunt resistor.

An output signal of current detecting circuit 111 is inputted to a zero current detecting circuit 107, and a reference voltage $V_{ref}$ is also inputted to this zero current detecting circuit 107. Similarly, an output signal of current detecting circuit 112 is inputted to a zero current detecting circuit 108, and a reference voltage $V_{ref}$ is also inputted to this zero current detecting circuit 108.

The current detecting circuits 111 and 112 and zero current detecting circuits 107 and 108 here make up a zero current detecting unit.

A signal (corresponding to an ON command) a, which turns ON and OFF the upper and lower arm IGBT 121 and 123, is inputted from a PWM signal input terminal PWM, and this signal a is inputted to one terminal of an AND circuit 101 and to an inverting circuit 103.

An output signal c of current detecting circuit 108 is inputted to the other terminal of AND circuit 101, and an output signal a' of AND circuit 101 is inputted to one terminal of an AND circuit 102.

A PWMOFF signal g is inputted to the other terminal of AND circuit 102 from a PWMOFF signal input terminal OFF.

An output signal a" of AND circuit 102 is converted to a signal (upper arm driving signal) d via a level shifting circuit 109, and is turned into a driving signal for IGBT 121 via an upper arm driving circuit 110.

An output signal of current detecting circuit 107 is converted to a signal e via level shifting circuit 109, and this signal e is inputted to one terminal of an AND circuit 104. An output signal b of inverting circuit 103 is inputted to the other terminal of AND circuit 104.

An output signal b' of AND circuit 104 is inputted together with PWMOFF signal g to an AND circuit 105, and an output signal (lower arm driving signal) f of AND circuit 105 is turned into a driving signal for IGBT 123 via a lower arm driving circuit 106.

According to the above description, AND circuits 101, 102, 104, and 105, inverting circuit 103, level shifting circuit 109, upper arm driving circuit 110 and lower arm driving circuit 106 make up a driving signal generating unit.

Further, zero current detecting unit including current detecting circuits 111 and 112 and zero current detecting circuits 107 and 108, and the above-mentioned driving signal generating unit make up a high-voltage IC (HVIC).

Next, the operation of this embodiment will be explained while referring to the timing chart of FIG. 2.

Signal (ON command) a inputted from PWM signal input terminal PWM makes up an ON command for the upper arm IGBT 121 when it is a "high" level, and makes up an ON command for the lower arm IGBT 123 when it is a "low" level.

Because signal b is a signal for which the logic of signal a is inverted by inverting circuit 103, when signal a is at a "high" level, signal b is at a "low" level, in other words, signal b makes up an OFF command for lower arm IGBT 123. Further, when signal a is at the "low" level, signal b is at the "high" level, and makes up an ON command for lower arm IGBT 123.

Current detecting circuits 111 and 112 detect voltage that is proportional to the output currents (collector currents) of the respective IGBT 121 and 123, and the fact that an output current is almost zero is detected by zero current detecting circuits 107 and 108.

A zero current detection signal (signal c) of lower arm IGBT 123 is operated on by AND circuit 101 together with signal a to form a logical product, and this logical product is inputted to AND circuit 102 as signal a'. In AND circuit 102, signal a' is outputted as signal a" when PWMOFF signal g is a "high" level, and this signal a" is converted by level shifting circuit 109 to signal d, which uses the collector potential of IGBT 121 as a reference. Then, this signal d is inputted to upper arm driving circuit 110, and makes up a driving signal that turns ON upper arm IGBT 121.

Conversely, a zero current detection signal of upper arm IGBT 121 is converted by level shifting circuit 109 to signal e, which uses the collector potential of IGBT 123 as a reference, and is operated on together with signal b by AND circuit 104 to form a logical product. Output signal b' of AND circuit 104 is inputted together with PWMOFF signal g to AND circuit 105, and when PWMOFF signal g is at a "high" level, signal b' is outputted from this AND circuit 105 as signal f. This signal f is inputted to lower arm driving circuit 106, and makes up the driving signal that turns ON lower arm IGBT 123.

Figure 2:
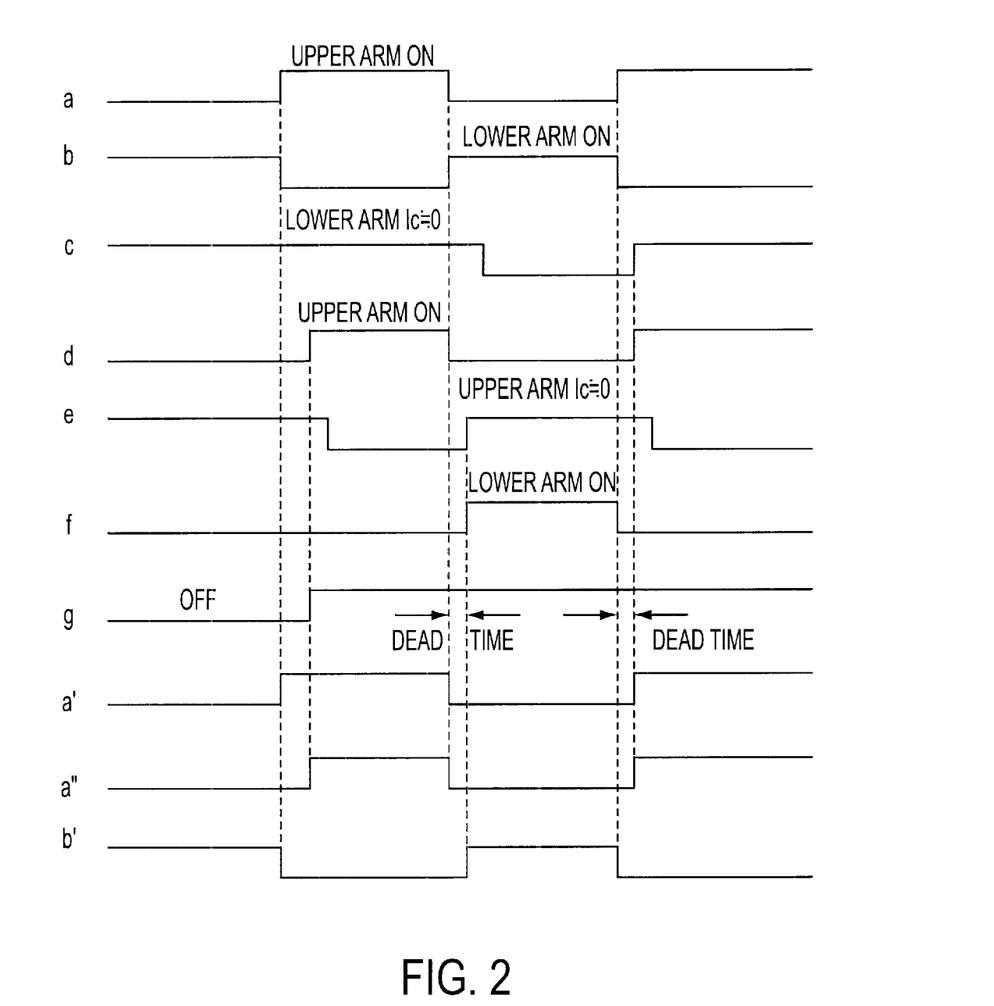
FIG. 2 is a timing chart showing the operation of an embodiment of the present invention.

As is clear from FIG. 2, dead time for simultaneously turning OFF both IGBT 121 and 123 is automatically added to driving signal d, which turns ON upper arm IGBT 121, and driving signal f, which turns ON lower arm IGBT 123. This makes it possible to prevent a short circuit of the upper and lower arms.

In the circuits shown in FIG. 6 and FIG. 7, because the dead time for the upper and lower arm IGBT was set via an open loop of sorts, the switching characteristics of the IGBT had to be known beforehand.

By contrast to this, in this embodiment, the fact that current flowing through lower arm IGBT 123, for example, has become practically zero is detected by the zero current detecting unit (current detecting circuit 112 and zero current detecting circuit 108), the detection result thereof is fed back as signal c, and driving signal d for upper arm IGBT 121 is produced by using this signal c and signal a, as well as OFF signal g. Similarly, the fact that current flowing through upper arm IGBT 121 has become practically zero is detected by the zero current detecting unit (current detecting circuit 111 and zero current detecting circuit 107), the detection result thereof is fed back as signal e, and driving signal f for lower arm IGBT 123 is produced by using this signal e and signal b, as well as OFF signal g.

Thus, according to this embodiment, even if the switching characteristics of the individual IGBT are unknown, sufficiently long required dead time can be set automatically. Therefore, when a power semiconductor module 100A is made up of a high-voltage IC, which includes a driving circuit, and an inverter element, it eliminates the trouble of resetting dead time while taking the IGBT driving mode into consideration as in the past. Further, at each IGBT switching operation, since dead time can be automatically set by detecting that actual collector current has become practically zero, the bother of setting dead time is also eliminated.

Furthermore, since there is no need to make dead time longer than necessary, the actual output voltage of the inverter can be set to a value close to a desired voltage, distortion of the output voltage waveform and current waveform can be minimized, and control performance can also be enhanced.

Furthermore, since the various logic circuits, upper arm driving circuit 110, lower arm driving circuit 106, current detecting circuits 111 and 112, and zero current detecting circuits 107 and 108 can be built in as high-voltage ICs, and can be combined with an inverter element, it is possible to make the overall circuitry simpler, and to reduce manufacturing costs.

Next, another embodiment of the present invention will be explained by referring to FIG. 3.

Explanations will be omitted for those elements that are the same as those in FIG. 1 and to which the same reference numerals have been assigned, and the explanation given hereinbelow will focus on those points that differ from FIG. 1.

Figure 3:
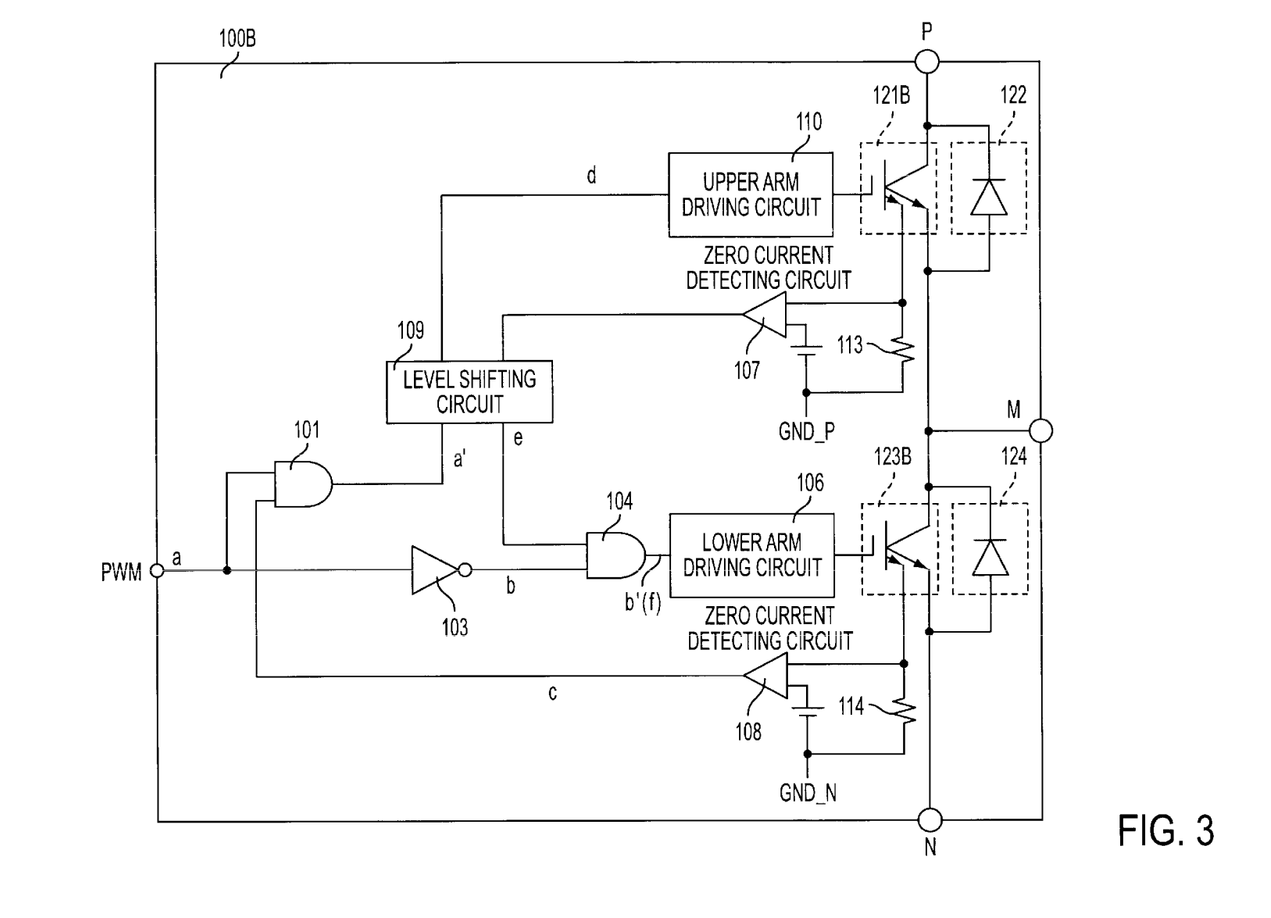
FIG. 3 is a circuit diagram showing another embodiment of the present invention.

In a power semiconductor module 100B of the second embodiment shown in FIG. 3, the make up of the zero current detecting unit, which may detect that the current flowing through IGBT 121B and 123B is practically zero, differs from that of the first embodiment.

In FIG. 3, 121B and 123B are IGBT, and these IGBT 121B and 123B include terminals (called sense emitters) for detecting a micro-current proportional to a main current. These sense emitters are connected to GND (ground) terminals via respective resistors 113 and 114. Accordingly, because voltages proportional to the output currents (collector currents) of IGBT 121B and 123B are generated at both terminals of resistors 113 and 114, by inputting these voltages to zero current detecting circuits 107 and 108, it is possible to detect that the output currents of IGBT 121B and 123B have practically become zero.

The respective IGBT sense emitters, resistors 113 and 114, and zero current detecting circuits 107 and 108 here make up the zero current detecting unit.

Furthermore, in this embodiment, a PWMOFF signal is not inputted, and the make up of the logic circuitry for producing upper arm driving signal d and lower arm driving signal f is simpler than that of the first embodiment.

That is, output signal a' of AND circuit 101 is inputted to level shifting circuit 109, and upper arm driving signal d is generated, and output signal b' of AND circuit 104 is used as-is as lower arm driving signal f.

Because the fact that the currents of IGBT 121B and 123B have become almost zero is detected, and based on the detection timing thereof, dead time is retained between signals d, f.

AND circuits 101 and 104, inverting circuit 103, level shifting circuit 109, upper arm driving circuit 110 and lower arm driving circuit 106 here make up the driving signal generating unit.

Next, a further embodiment of the present invention will be explained by referring to FIG. 4.

Explanations will be omitted for those elements that are the same as those in FIG. 1 and FIG. 3 and to which the same reference numerals have been assigned, and the explanation given hereinbelow will focus on those points that differ from FIG. I and FIG. 3.

Figure 4:
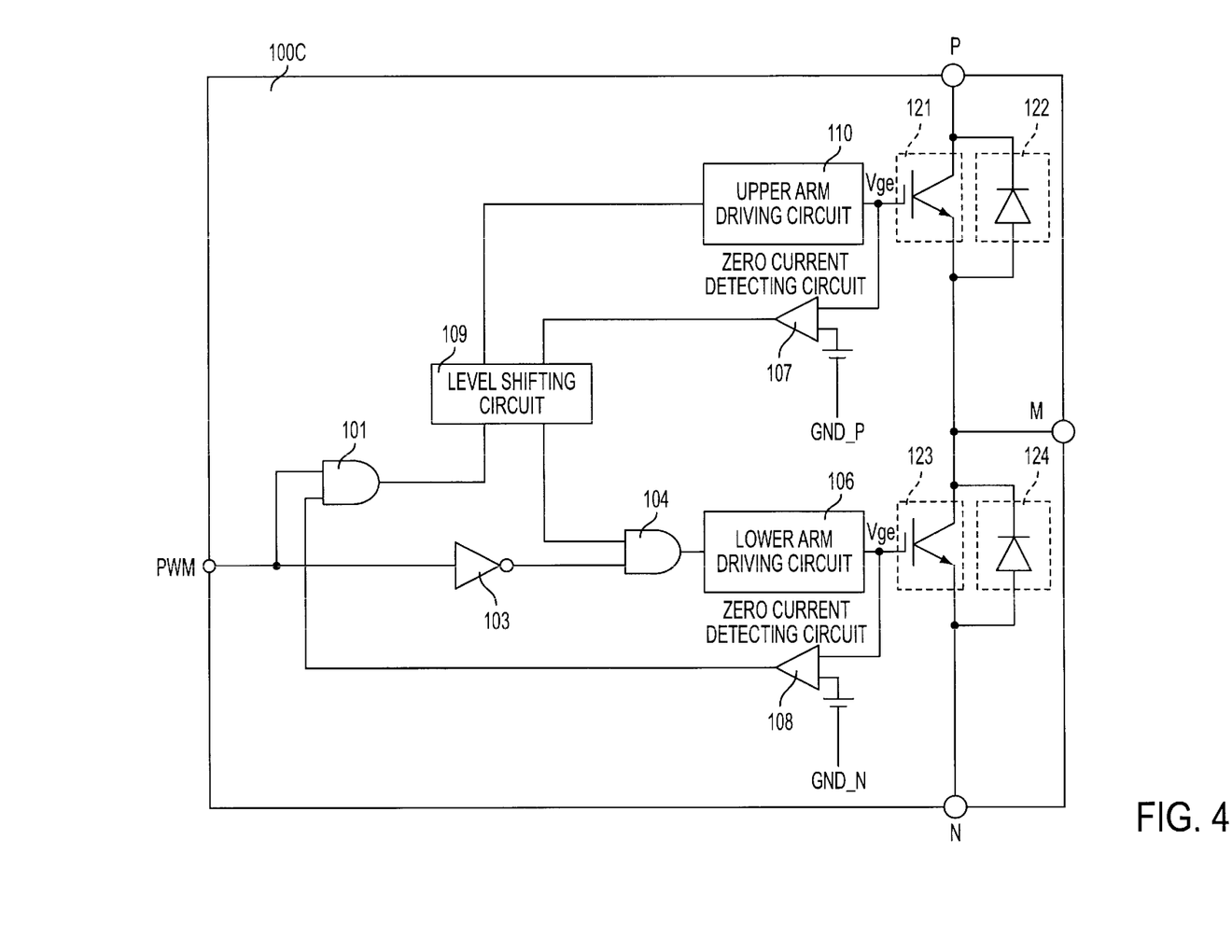
FIG. 4 is a circuit diagram showing still another embodiment of the present invention.

In a power semiconductor module 100C of this embodiment shown in FIG. 4, the make up of the zero current detecting unit, which detects that the output currents of IGBT 121 and 123 have become practically zero, differs from that of the other previous embodiments.

Collector currents $I_c$ of IGBT 121 and 123 are controlled by the respective gate voltages (gate-emitter voltages) $V_{ge}$. Therefore, if gate voltages $V_{ge}$ become sufficiently smaller than the threshold value voltages of IGBT 121 and 123, and drop to values approaching zero volts, IGBT 121 and 123 constitute OFF states, and it is possible to make a determination that collector currents $I_c$ are practically zero amperes.

With the above point in view, the gate voltages $V_{ge}$ of IGBT 121 and 123 are inputted to zero current detecting circuits 107 and 108, respectively, and compared against a reference voltage (threshold value voltage), and the fact that the currents of IGBT 121 and 123 are almost zero is detected.

Gate voltage $V_{ge}$ detecting unit for IGBT 121 and 123 and zero current detecting circuits 107 unit 108 here make up the zero current detecting unit.

Furthermore, since the make up of the logic circuitry, and the operation for generating dead time are the same as those in the previous embodiment, an explanation thereof will be omitted for the sake of avoiding duplication.

Lastly, a further embodiment of the present invention will be explained by referring to FIG. 5.

Explanations will be omitted for those elements that are the same as those in FIG. 1, FIG. 3 and FIG. 4 and to which the same reference numerals have been assigned, and the explanation given hereinbelow will focus on those points that differ from FIG. 1, FIG. 3 and FIG. 4.

Figure 5:
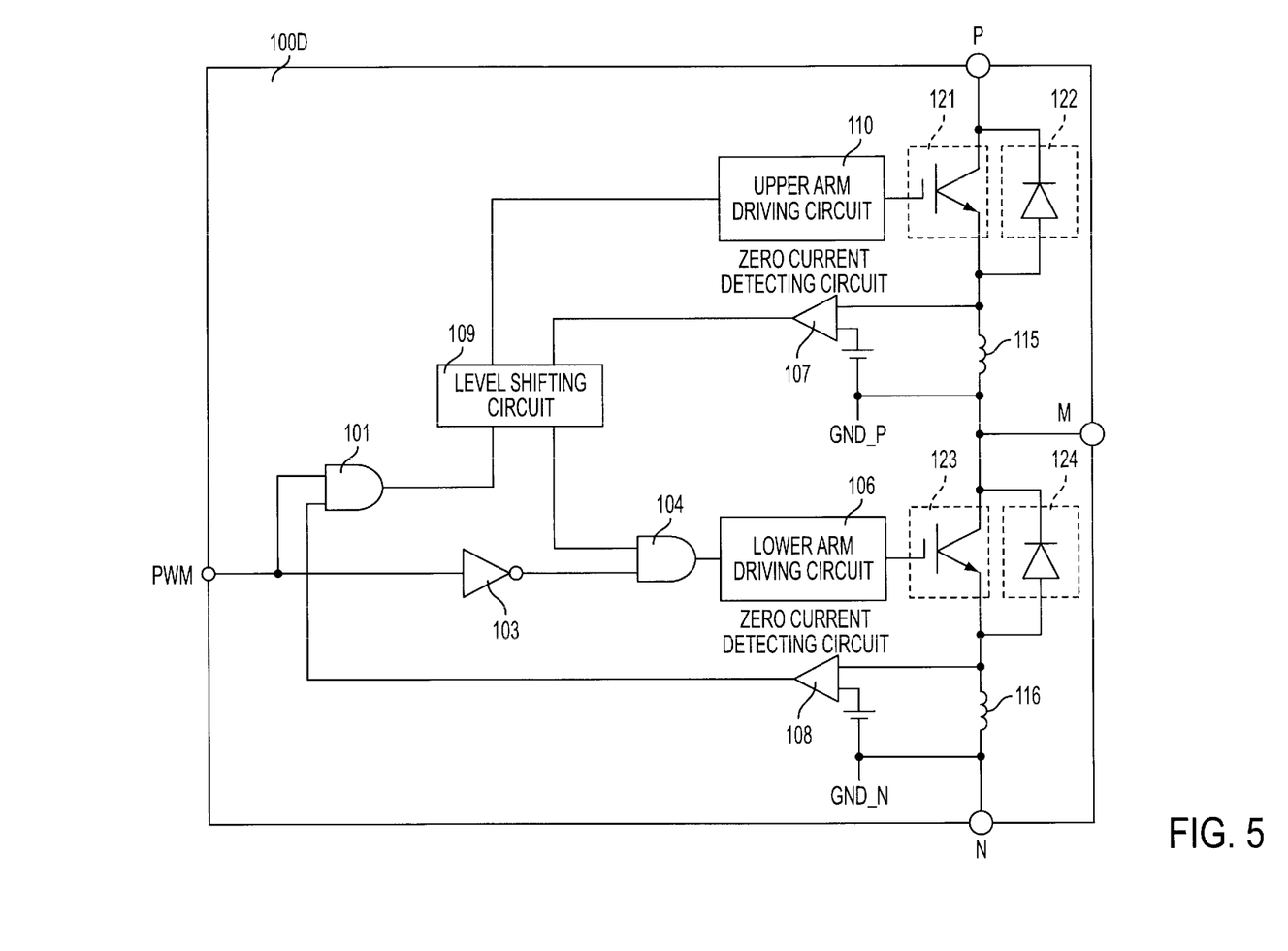
FIG. 5 is a circuit diagram showing a further embodiment of the present invention.

In a power semiconductor module 100D of this embodiment shown in FIG. 5, the make up of the zero current detecting unit, which detects that the output currents of IGBT 121 and 123 have become practically zero, differs from that of the previous embodiments.

In this embodiment, inductances 115 and 116 are respectively inserted between the emitter of IGBT 121 and AC output terminal M, and between the emitter of IGBT 123 and negative DC input terminal N. These inductances 115 and 116 can be achieved by using wiring inductance, or an inductive device can be inserted separately.

One terminal of each of these inductances 115 and 116 is connected to a zero current detecting circuit 107 and 108, and the other terminal of each of these inductances 115 and 116 is connected to a GND terminal.

The inductances 115 and 116 and zero current detecting circuits 107 and 108 here make up the zero current detecting unit.

When the current flowing through inductances 115 and 116 changes, a voltage the size of (L ·di/dt) is generated, and when the current i becomes practically zero, the size of the above-mentioned voltage (L ·di/dt) becomes practically zero.

Accordingly, the fact that the output current of IGBT 121 and 123 has become almost zero is detected by zero current detecting circuits 107 and 108 by detecting the voltages at both terminals of inductances 115 and 116.

Furthermore, since the make up of the logic circuitry, and the operation for generating dead time are the same as previous embodiments, an explanation thereof will be omitted for the sake of avoiding duplication.

For each of the above-described embodiments, explanations were given of cases, which utilized IGBT as the power semiconductor device, but a field-effect transistor("FET") can also be used as the power semiconductor device.

Further, the inverter utilized in the semiconductor modules of the present invention is not limited to three phases, but rather can be a single-phase inverter, or a multi-phase inverter of more than three phases.

Furthermore, a power conversion apparatus other than an inverter can also be used.

As explained hereinabove, the output current of a power semiconductor device of the arm of the one side of upper and lower arms is detected as being nearly zero, and, using the detection signal thereof and an ON command for the power semiconductor device of the arm of the other side, an ON command for the power semiconductor device of the arm of the other side is generated.

Embodiments of the present invention are made up such that, after detecting that the power semiconductor device of the arm of the one side is substantially OFF, the power semiconductor device of the arm of the other side is turned ON. Thus it is possible for the optimum dead time to be automatically set without being affected by the driving circuit or driving mode of the semiconductor devices, or the switching characteristics of the individual semiconductor devices.

Further, embodiments of the present invention do away with the need to set a longer than necessary dead time, minimize the distortion of the output voltage waveform and current waveform, which contributes toward increasing the responsiveness, lowering of the vibration, reducing the noise of an inverter or the like, and enhancing control performance.

Furthermore, because the zero current detecting unit and driving signal generating unit are relatively simple, it is possible to achieve a highly practicable power semiconductor module at low cost.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A power semiconductor module, comprising:

a pair of power semiconductor devices arranged in upper and lower arms, respectively;

driving circuits to drive the power semiconductor devices;

upper and lower zero current detecting units to detect respectively that output currents of the power semiconductor devices of the upper and lower arms have become nearly zero;

level shifting circuit for the lower arm to convert a signal derived from an output of the zero current detecting unit of the upper arm based on a potential of the semiconductor device of the lower arm;

a driving signal generating unit for the lower arm to generate an actual driving signal for the power semiconductor device of the lower arm based on the output signal of the level shifting circuit for the lower arm and an ON command for the power semiconductor device of the lower arm;

level shifting circuit for the upper arm to convert a signal derived from an output of the zero current detecting unit for the lower arm based on a potential of the semiconductor device of the upper arm; and a driving signal generating unit for the upper arm to generate an actual driving signal for the power semiconductor device of the upper arm based on an output signal of the level shifting circuit for the upper arm and an ON command for the power semiconductor device of the upper arm.

2. The power semiconductor module of claim 1, wherein the respective zero current detecting units include circuitry that directly detect the respective output current of the power semiconductor devices of the upper and lower arms.

3. The power semiconductor module of claim 1, wherein the respective zero current detecting units include circuitry that detect a current that is proportional to the respective output current of the power semiconductor devices of the upper and lower arms.

4. The power semiconductor module of claim 3, wherein the respective zero current detecting units include circuitry that detect a current that is proportional to an output current from a sense emitter of respective power semiconductor devices of the upper and lower arms.

5. The power semiconductor module of claim 1, wherein the respective zero current detecting units include circuitry that detect an output current from a voltage of a control terminal of respective power semiconductor devices of the upper and lower arms.

6. The power semiconductor module of claim 1, wherein the respective zero current detecting units include circuitry that detect changes over time in the respective output current of the power semiconductor devices of the upper and lower arms.

7. The power semiconductor module of claim 1, wherein the respective zero current detecting units and the respective driving signal generating units comprise high-voltage IC.

8. The power semiconductor module of claim 1, wherein the pair of power semiconductor devices are disposed in the upper and lower arms, respectively, of a single-phase segment of an inverter.

9. The power semiconductor module of claim 1, wherein the ON commands respectively input to the respective driving signal generating units are PWM signals.

10. The power semiconductor module of claim 3, wherein respective zero current detecting units and the respective driving signal generating units comprise high-voltage IC.

11. The power semiconductor module of claim 3, wherein the pair of power semiconductor devices are disposed in the upper and lower arms, respectively, of a single-phase segment of an inverter.

12. The power semiconductor module of claim 3, wherein the ON commands respectively inputted to respective driving signal generating units are PWM signals.

13. The power semiconductor module of claim 4, wherein respective zero current detecting units and the respective driving signal generating units comprise high-voltage IC.

14. The power semiconductor module of claim 4, wherein the pair of power semiconductor devices are disposed in the upper and lower arms, respectively, of a single-phase segment of an inverter.

15. The power semiconductor module of claim 4, wherein the ON commands respectively input to the respective driving signal generating units are PWM signals.

16. The power semiconductor module of claim 5, wherein the respective zero current detecting units and the respective driving signal generating units comprise high-voltage IC.

17. The power semiconductor module of claim 5, wherein the pair of power semiconductor devices are disposed in the upper and lower arms, respectively, of a single-phase segment of an inverter.

18. The power semiconductor module of claim 5, wherein the ON commands respectively input to the respective driving signal generating units are PWM signals.

19. The power semiconductor module of claim 6, wherein the respective zero current detecting units and the respective driving signal generating units comprise high-voltage IC.

20. The power semiconductor module of claim 6, wherein the pair of power semiconductor devices are disposed in the upper and lower arms, respectively, of a single-phase segment of an inverter.

21. The power semiconductor module of claim 6, wherein the ON commands respectively input to the respective driving signal generating units are PWM signals.

22. The power semiconductor module of claim 1, wherein the level shifting circuit at least comprises a high-voltage IC.

* * * * *